United States Patent [19]

Bryant

[11] 4,205,890
[45] Jun. 3, 1980

[54] PLUG AND SOCKET CONNECTOR FOR ELECTRIC CIRCUITS

[75] Inventor: Stanley Bryant, Taree, Australia

[73] Assignee: Bryant Manufacturing Pty. Limited, Taree, Australia

[21] Appl. No.: 945,096

[22] Filed: Sep. 22, 1978

[30] Foreign Application Priority Data

Sep. 23, 1977 [AU] Australia .............................. 1797/77

[51] Int. Cl.² .......................................... H01R 13/60
[52] U.S. Cl. ............................. 339/119 R; 339/44 M; 339/184 M
[58] Field of Search ..................... 339/36, 44 R, 44 M, 339/119, 39, 107, 113 B, 125 R, 132 R, 132 B, 138, 141, 206 R, 208, 189 M, 185 R

[56] References Cited

U.S. PATENT DOCUMENTS

| 2,090,761 | 8/1937 | Lewyt | 339/138 X |
|---|---|---|---|
| 3,176,257 | 3/1965 | Introvigne | 339/36 |
| 3,248,683 | 4/1966 | DePenti | 339/44 R X |
| 3,417,213 | 12/1968 | Bryant | 339/44 M X |
| 3,781,766 | 12/1973 | Teagno et al. | 339/20 B X |
| 4,108,527 | 8/1978 | Douty et al. | 339/107 |

Primary Examiner—Roy Lake
Assistant Examiner—Eugene F. Desmond
Attorney, Agent, or Firm—Darby & Darby

[57] ABSTRACT

A plug and socket connector for the electric circuits of towing and towed vehicles, incorporating 12 terminals. The connector consists of a plug half and a socket half, each half including a body and a pair of covers removably secured to the body, and a lid for the terminals. Each lid is movable to cover the terminals when the connector halves are disconnected and is movable to be retained in an open position when the connector halves are connected together. Shrouds are also provided for the terminals of each connector half and the covers for each said half are so arranged that they can be individually removed and replaced to allow for ready access to a selected side of a connector half. The covers are arranged whereby they can only be assembled in the correct position and they also serve as handgrips.

11 Claims, 6 Drawing Figures

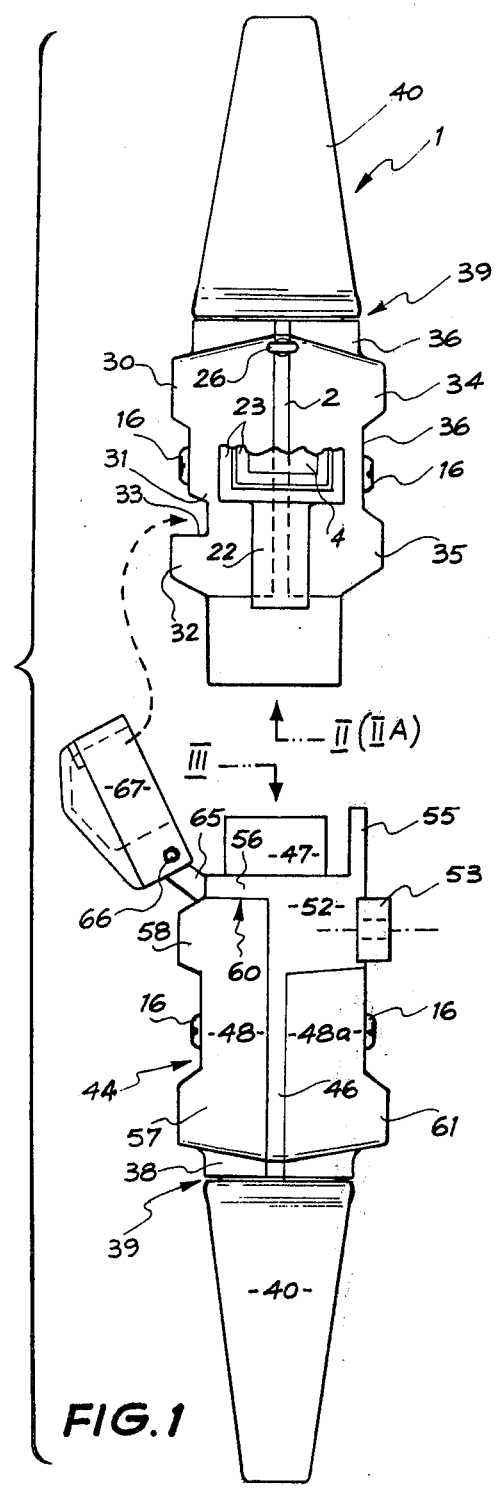
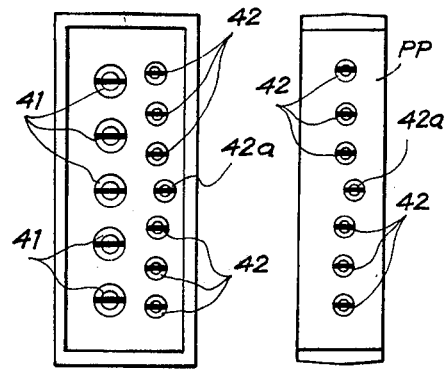
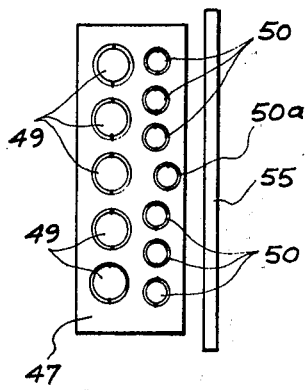
FIG. 1
FIG. 2  FIG. 2A
FIG. 3

PLUG AND SOCKET CONNECTOR FOR ELECTRIC CIRCUITS

This invention relates to plug and socket connectors for electric circuits, the said plug and socket connector being of the general type disclosed in our Australian Pat. Nos. 286,200, 293,152 and 446,128.

An object of the present invention is to provide a plug and socket connector of the general type referred to, which incorporates features not foreshadowed by the known connectors. The present invention provides a connector which is more adaptable to present day towing and towed vehicles, as it can accommodate the substantial increase in the number of electrically powered items fitted to towed vehicles, without greatly altering the shape and overall dimensions of the known connectors referred to, and it also enables continued interchangeability between towed and towing vehicles.

The aforementioned object foreshadows the provision of plug and socket connector which incorporates 12 terminals as compared with 7 disclosed in the specifications of the mentioned prior Patents, and for which the construction of the connector halves is such that terminal sockets and terminal pins may be securely mounted in the respective halves without danger of dislodgement even during the most arduous conditions of work. Also the connector halves are arranged to be firmly held together when connected for use, with protection being provided for the terminals of the connector halves when so connected on the towing and towed vehicles, or when disconnected, against the abrasive action of grit, mud and the like.

According to the invention the connector is characterised in that the plug and socket halves of the connector each include a body which is rectangular in plan, and a pair of covers removably secured to the body, said body comprising a limb and a somewhat T-shaped head formed integrally with the body, said head having two parallel rows of terminals mounted therein in desired spaced relationship and also having a lid mounted thereon; said lid being adapted and arranged to be closed over the head and over the terminals and to be retained in an open position whereby the plug and socket halves may be connected together; each said cover having a neck formed in one end thereof registering with a like neck formed in the juxtaposed said cover thereby providing a cable entry opening for each said connector half; clamping means on the limb for clamping a multi-cable sheath in the cable entry opening with selected cables located on opposite faces of the limb for individual connection to individual terminals of the two rows of terminals; partition walls formed on said opposite faces of the head integrally with said head said walls providing individual compartments for the terminals; and mounting feet for the connector formed on one said cover whereby the connector half supporting that said cover is secured to a base support and the other connector half is connected thereto and is disconnected therefrom.

FIG. 1 is an exploded side elevational view of the plug and socket halves of the connector. Part of the lid of the plug half—in its folded back position—is broken away and the connector halves are shown disconnected.

FIG. 2 is a diagrammatic end view of the plug half of the connector, showing the disposition of the pin terminals in the head thereof.

FIG. 2A is a similar view to FIG. 2 of the plug half of the connector of prior Pat. No. 446,128, showing how the pin terminals of this socket half correspond with the like pin terminals of FIG. 2.

FIG. 3 is a diagrammatic end view of the socket half of the connector, showing the disposition of the socket terminals therein.

Figure 4:
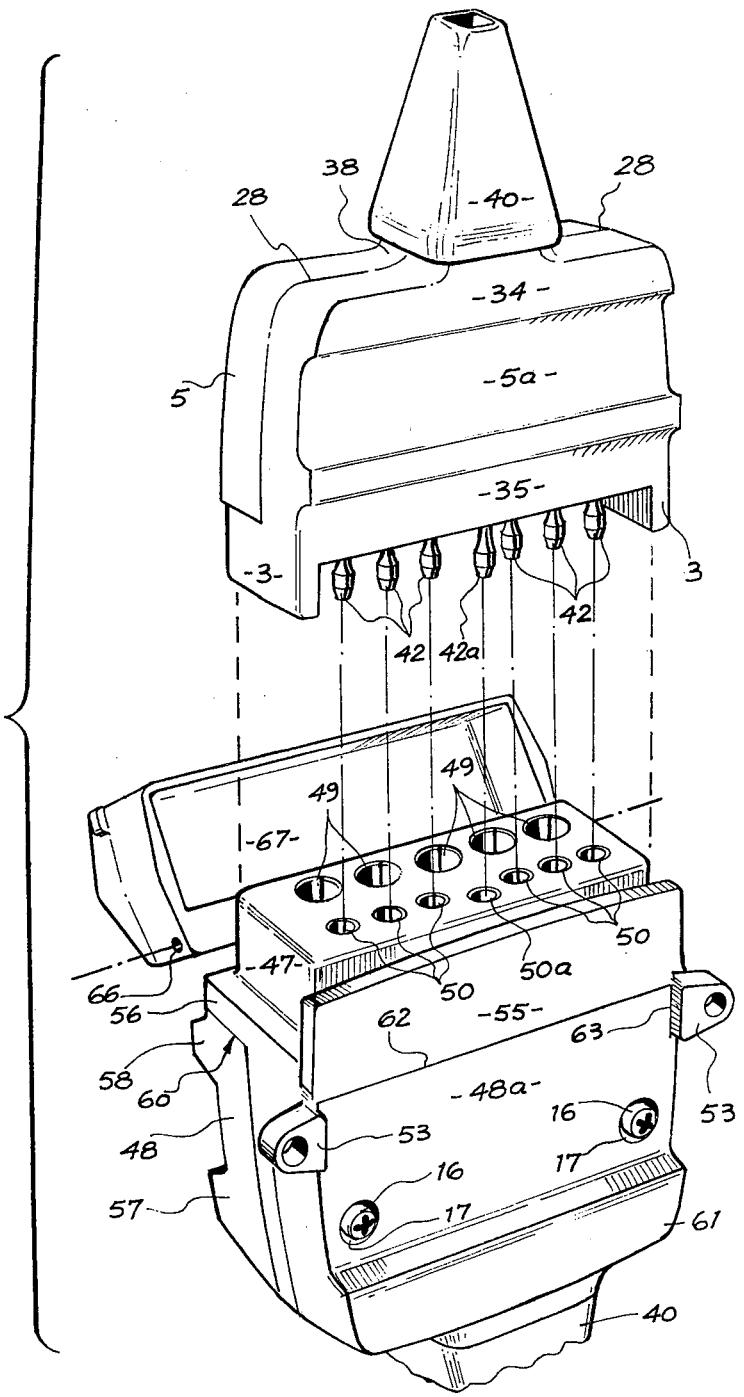
FIG. 4 is a perspective view of disconnected connector halves, being the socket half of the present invention and the plug half of the connector of prior Pat. No. 446,128.

The plug half 1 of the connector consists of a body which is rectangular in plan and which comprises a limb 2, a head 3 integral with the limb 2, a lid 4 integral with the head 3, and a pair of covers 5–5a adapted to be removably secured to the body in a manner to be explained. These components are all moulded from a suitable dielectric (plastics) material.

The limb 2 is bounded on two sides and at its outer end by a chimb-like flange 6 and at said end a cable opening is formed which is bounded by inwardly extending portions 7 of the flanges 6, integral widened shoulders 8 and a bridge block 9. The shoulders 8 are extended towards each flange 6 as at 10, to provide thickened portions in which screw holes 11 are formed. Cable clamps 12 are secured to the thickened portions 10 by screws 13.

The limb 2 has a pair of transversely spaced integrally formed bosses 14 projecting from each face thereof and each of these bosses 14, has a screw hole 15 formed therein. The covers 5–5a are fixed to the body by screws 16 passing through counterbored clearance holes 17 in said covers 5–5a, into the screw holes 15.

At its junction with the head 3, the limb 2 is formed to provide a pair of ledges 18–19 one on each face of said limb 2, and above each ledge 18–19 shoulders 20 are formed, each of which projects outwardly from a said face of limb 2. Cable partitions walls 21 are formed in spaced apart groups on each said face and they extend from a said shoulder 20 to a ledge 18–19. In the illustrated embodiment, there are six walls 21 on one face of the limb and four walls 21 (not shown) on the other face.

The head 3 is rectangular, open-topped hollow housing and a lid 4 is joined to the head 3 by a flexible, integral strap 22. The lid 4 is edge-shaped as indicated at 23 whereby it fits into the head 3 as a frictional retaining fit in a closed position in and over said head 3. A pull tab 24 is provided on the free end of the lid 4 to release it from the closed position and a snap catch 25 is formed externally on the top of the lid 4 for releasable engagement with a catch pin 26 formed on a peg 27 projecting outwardly from one side of limb 2. This arrangement permits the lid 4 to be held in the open—folded back—position as required.

The covers 5–5a are hollow shell-like members which are basically rectangular in plan and are shaped around the edge 28 thereof to abut the flanges 6 of the limb 2 to enclose the inside of each limb and thus enclose the components as described, which are located on said limb 2. To provide a correct location of the covers 5–5a on the said flanges 6, the edge 28 of the cover has an outwardly projecting nosing 29 formed thereon which is located inside a flange 6 and thus correctly positions the cover when a said cover 5 or 5a is abutted against a said flange 6.

The cover 5 has three deepened channel portions formed transversely thereacross, as particularly indicated at 30, 31 and 32, FIG. 1. The channel portion 30 houses the thickened portions 10, the cable clamp 12 and the screws 13. The channel portion 31 receives the outer ends of the bosses 14 which are juxtaposed the inner surface of said channel portion 31 and clearance holes 17 are formed through said channel portion 31 for the screws 16 which are screwed into the bosses 14. The channel portion 32 allows for variation in the height of terminal and cable securing screws, which may occur when users elect to use a variety of cable sizes. It also houses the cable partition walls 21 on its sides of the limb 2 and in addition, it is formed externally with a vertical face 33 which serves as a catch face for a lid to be described, which is hingeably mounted on the adjacent cover also to be described, of the socket half of the connector. The vertical face 33 is the only such face formed on all of the covers of the plug and socket halves of the connector and thus provides a positive identification for the cover 5 in assembly of the connector or components, without having to provide a locating key of any type.

The cover 5a has two deepened channel portions 34, 35 formed thereacross, see also FIG. 1. The channel 34 houses the thickened portions 10, the clamp 12 and its screws 13. The channel portion 35 allows for variation in screw height previously referred to and also houses the cable partition walls 21 on its side of the limb 2. The outer ends of the bosses 14 on the side of limb 2 are juxtaposed the inner surface of the cover wall part 36 located between the channel portions 34, 35 and said wall part 36 has the clearance holes 17 formed therethrough, for the screws 16 which are screwed into the bosses 14.

Both covers 5, 5a have a hollow cable neck 37 formed at the outer end. Each neck includes a shoulder 38 which is shaped internally to receive a pair of the shoulders 8 and part of the thickened portions 10 to assist the correct positioning of the covers 5, 5a on the limb 2. Also, each neck has a groove 39 formed externally thereround adjacent said shoulder 38, into which one end of a flexible dust cover or gaiter 40 is snap fitted.

Figure 5:
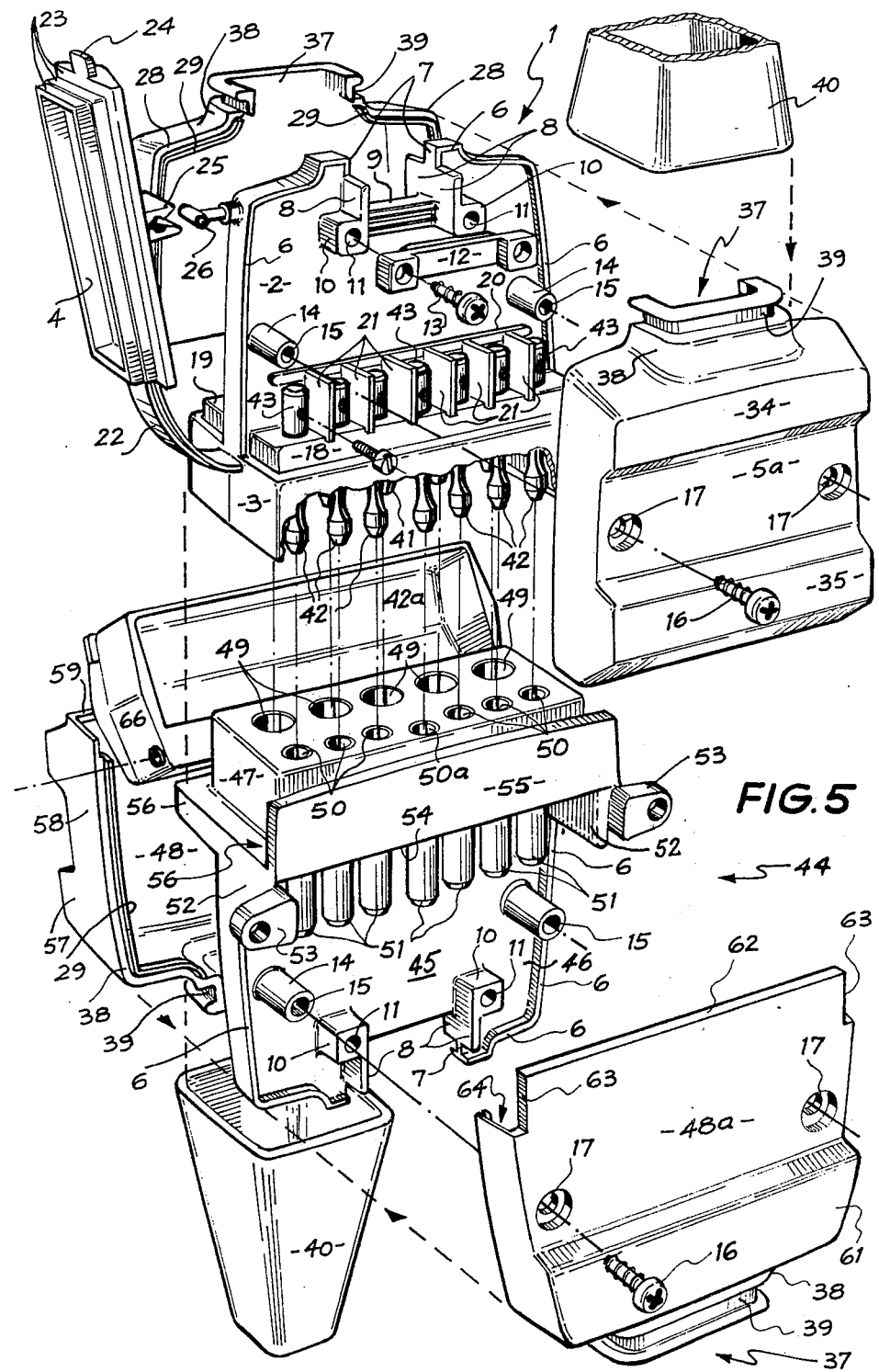
FIG. 5 is an exploded perspective view of the plug and socket halves of the connector, wherein the component parts of the connector are located and arranged to clearly illustrate the individual functions of these parts.

As seen in FIGS. 2 and 5, the plug half of the connector carries twelve male contracts (pin terminals), arranged in two rows in the head 3 of limb 2, consisting of five transversely aligned pin terminals 41 of larger diameter and 7 pin terminals 42 of smaller diameter. The smaller diameter pins 42 are also transversely aligned with the exception of the centre one 42a, which is offset from the remainder. The centre pin 42a being so offset, prevents the plug half from being forced into the socket half the wrong way round. If this is attempted, the amount it is offset is reversed and thus the offsetting acts as a positive keying to prevent incorrect insertion of the plug into the socket, thus avoiding the need to provide a mixture of pin terminal sizes. The pin terminals 41, 42 and 42a each include an integral cable connecting end 43 with which the electric leads are individually connected in known manner. The connecting ends 43 of the pin terminals are shielded from each other by the partition walls 21 and the pins 42, 42a are housed in and shrouded by the hollow head 3.

With particular reference to FIG. 2A, it will be apparent the arrangement of the pin terminals 41, 42, 42a described, permits the use of the plug half of the connector of the mentioned prior Pat. No. 446,128 to be used with the socket half of the connector of the present invention as will become apparent hereafter. It will be seen from FIG. 2A that the plug half of prior Pat. No. 446,128 is referenced PP and the pin terminals thereof are referenced 42, 42a to conform with the referencing numerals of the pin terminals 42, 42a of the present invention.

The socket half 44 of the connector also consists of a somewhat T-shaped body 45 which is rectangular in plan and which comprises a limb 46, a head 47 integral with the limb 46, and a pair of covers 48-48a adapted to be removably secured to the limb 46 in the same manner as the covers 5-5a are secured to limb 2 of the plug half 1 of connector. Again these various components are moulded from a suitable dielectric (plastics) material and features of the components 45, 46, 47, 48-48a which are similar to the like features of the like components of the plug half 1, will be similarly referenced and will not be further described.

For the socket half 44, the head 47 is a rectangular, solid component having two banks of circular openings formed therethrough in which are housed five socket terminals 49 of larger diameter and seven socket terminals 50 of smaller diameter mounted therein, registering with the corresponding pin terminals 42, 42a of the plug half 1. The socket terminals 49, 50 project through the head 47 to the terminal abutment or lock on each face of the limb 46 as indicated at 51 and have electric leads connected thereto.

One surface of the limb 46 at its junction with the head 47, is provided at each side of said limb 46 with a pair of internal rearwardly extending flanges 52, formed integrally with said limb 46. Formed integrally with said flanges 52 are a pair mounting feet 53 one on each side of the limb 46 for mounting the socket half 44 on a base support; a ledge 54 through which the terminal socket ends 50 project; and a shroud 55 which is parallel with and spaced from the juxtaposed side face of the head 47, for reasons to be explained. Opposite the flanges 52, the limb is provided with an integrally formed flange 56 which surrounds the head 47 and the surface of which is continuous with the upper surfaces of the flange 52.

The cover 48 has two deepened channel portions 57, 58 formed thereacross, see also FIG. 1. The channel 57 houses the thickened portions 10, the cable clamps 12 and screws 14. The channel 58 allows for variation in screw height previously referred to and also houses the socket extensions on this face of limb 46. Also the cover 48 at this end is formed with an internal step 59 which abuts a registering shoulder indicated at 60, FIG. 1 to correctly locate the cover 48.

The cover 48a has only one deepened channel portion 61 formed thereacross, which houses the thickened portions 10, the cable clamps 12 and screws 13. Cover 48a also includes a locating flange 62 formed integrally therewith, said flange 62 being stepped as at 63 at each "forward" corner thereof. An internal shoulder indicated at 64, is formed in each side wall of the cover 48a, to abut the edges of the flanges 52 and correctly locate said cover 48a when it is mounted upon the limb 46. The flange 62 provides a stone shield on sandblast protection for the lid 67, to prevent the ingress of foreign matter, when the socket half of the connector is fitted on the rear of a vehicle and the vehicle is used in sandy or dry country, for example, without a towed vehicle being coupled to said vehicle.

Thus it will be apparent that the covers 48-48a cannot be transposed on the socket half 44 of the connector, nor can they be mounted upon the plug half 1.

The flange 56 includes a pair of integrally formed, outwardly projecting arms 65 (FIG. 1) in which a hinge pin 66 is mounted. The pin 66 hingeably supports a lid 67 which is similar to that of the prior patents. The openings in the lid 67 for the pin 66 are tapered for substantially the greater part of their length and thus provide clearance longitudinally in the lid 67 around said pin 66. The larger diameter of the taper is on the outside and tapers inwardly to a small bearing surface. This (cone-shaped) formation serves to prevent the hinge becoming jammed by fine dust. Also, movement of the lid loosens and ejects any dust or mud accumulating in the openings. When the socket half 44 is disconnected from the plug half 1, the lid is closed over the head 47 and shrouds the terminal sockets 49, 50, 5a and it fits between the head 47 and the shroud 55. When the socket half 44 is connected to the plug half 1, the lid 67 remains in the open position seen in FIGS. 1 and 5. In this position it provides, in conjunction with shroud 55, partial protection for the head 3 which receives and surround the head 47.

The connector of the present invention offers the following advantages over the connectors of the mentioned prior Patents.

The limbs 2, 46 of the T-shaped bodies are utilised for the display of indicia such as the indentification of the various terminals and circuit location, for correct circuit connection and interchangeability and also as an easy means for fixing the terminals in correct positions in the socket halves.

The pin and socket terminals are arranged and located in the heads 3 and 47 to ensure that the plug and socket halves of the connector can only be joined in one way, with the head 3 enclosing the head 47. In this regard, even if the shroud 55 becomes damaged, the head 3 still shrouds the head 47.

Provision of the shoulders 20 on the limb 2 provides a means for ensuring correct endwise location of the pin terminals in the head 3 and also act as a means for preventing endwise movement of the pin terminals in the head 3.

The covers 5, 5a-48, 48a act as handgrips for the connector halves and as they are readily removable individually, they facilitate inspection and testing of the various components of the connector, in situ if desired.

The dust covers 40 are cone-shaped internally and externally, thus providing a means whereby they can be cut to a desired length to accommodate a cable of predetermined outside diameter.

As described and illustrated, the connector halves support 12 pin terminals and 12 socket terminals and these terminal connections are adapted, for example, for the following uses, and may be so identified on the limbs 2 and 46:
1. Left turn signal
2. Right turn signal
3. Stop lamp
4. Tail lamp
5. Earth
6. Interior lamps or refrigerator or like accessories; or auxiliary spare for use with side marker lamps, for example.
7. Electric brakes
8. Battery charge
9. Earth return
10. Reverse and or fog lamp
11. Clearance lamps or auxiliary spare for use with an electric winch for example
12. An auxiliary spare, for future requirements.

It will be understood that with the development of large numbers of lights and other electrically activated components now utilised on towed vehicles, the capacity of plug and socket connectors for conducting power to the various units referred to must be increased over known plug and socket connectors such as those subject of the mentioned prior Patents. Also the socket half of the present invention functions as a master socket, in that it will accommodate the trailer 7-pin "in-line" connector plug half of prior Pat. No. 446,128, both mechanically and electrically. Thus the present invention provides a unique trailer electrical plug and socket connector which is of compact construction and readily mountable on a vehicle; it can accommodate the substantial increase in the number of pin and socket terminals now required, without greatly increasing the overall dimensions of the connector; it provides a connector capable of withstanding the most rigorous conditions of use without failing; and it also provides easy access for connecting the correct cables to their allocated positions in both halves.

It is also preferred to longitudinally slot the pin and socket terminals of the connector, to improve the connection and disconnection of the socket halves. The pin terminals are also shown with enlarged heads and this, in conjunction with the slotting referred to, enables the pins to readily centralize in the socket terminals. Also, should there be a slight variation in production (moulding), such as shrinkage, in the main connector body, the self-aligning feature is very important and enables the pins to assume their correct position when the socket halves are disconnected.

Slotting the socket terminals at right-angles to the slotting of the pin terminals, simplifies production of these components and ensures good electrical contact when the connector halves are coupled together.

I claim:

1. A plug and socket connector for electric circuits, characterised in that the plug and socket halves of the connector each include a body which is rectangular in plan, and a pair of juxtaposed covers removably secured to the body, each said body comprising a limb and a somewhat T-shaped head formed integrally with the body, each said head having parallel rows of terminals mounted therein in desired spaced relationship, a lid mounted on each said body and being adapted and arranged to be closed over the head and over the terminals of each said body and to be retained in an open position whereby the plug and socket halves may be connected together; each said cover having a neck formed in one end thereof registering with a like neck formed in the juxtaposed corresponding cover thereby providing a cable entry opening for each said connector half; clamping means on the limb for clamping a multicable sheath in the cable entry opening with selected cables located on opposite faces of the limb for individual connection to individual terminals of the rows of terminals; partition walls formed on said opposite faces of one said limb integrally with the corresponding head, said walls providing individual compartments for the terminals; and mounting feet for the connector formed on one said cover whereby the connector half supporting that said cover is secured to a base support and the other connector half is connected thereto and is disconnected therefrom.

2. A plug and socket connector according to claim 1, wherein the limb has a chimb-like flange formed therearound and each said cover has an outwardly projecting nosing formed therein located inside the flange on the limb when a said cover is abutted against said flange, whereby the cover is correctly positioned on said flange.

3. A plug and socket connector according to claim 1 wherein the limb has cover mounting bosses formed in desired spaced relationship on each face thereof and projecting outwardly therefrom and the cover has screw holes formed therethrough located to register with the mounting bosses whereby the covers are secured upon and are individually removable from the limb; and wherein each said cover has a groove formed externally around the neck thereof whereby a dust cover or gaiter may be snap fitted on said covers over the cable entry opening.

4. A plug and socket connector according to claim 1, wherein the limb has circuitry indicia formed thereon adjacent each said terminal whereby said terminals are identified for circuit connection and interchangeability.

5. A plug and socket connector according to claim 1, wherein the body of the plug half of the connector has a flexible strap formed integrally therewith adjacent the junction of the limb with the head and the lid for this connector half is formed integrally with the strap; the head is a rectangular, hollow shell with pin terminals therein; the lid is edge-shaped to frictionally, removably engage inside the head to enclose the pin terminals; and the lid has a clip formed thereon for releasable engagement with a catch pin formed on the limb remote from the strap; whereby the lid is closed over the head or is held by the clip in an open position.

6. A plug and socket connector according to claim 5, wherein the limb has cover mounting bosses formed in desired spaced relationship in each face thereof and projecting outwardly therefrom; and wherein one said cover for the plug half of the connector has three deepened channel portions formed transversely thereacross and the other said cover has two deepened channel portions formed transversely thereacross accommodating the clamping means, the mounting bosses and the partition walls on said limb and head and also permitting variation in the height of screws securing the cover to the limb; and wherein one of the deepened channel portions of said three has a lid-engaging face formed thereon vertical to the limb for engagement by the lid on the socket half of the connector when said connector halves are joined together.

7. A plug and socket connector according to claim 1, wherein the body of the socket of the connector has the head formed thereon as a solid, rectangular member dimensioned to fit into the head of the plug half of the connector, and a shroud is formed integrally with the head in parallel spaced relationship to one side of the head; and wherein the socket lid is hingeably mounted upon the opposite side of the head, said lid being movable to a closed position over the head and to an open position, said lid being movable to engage a lid-engaging face of one said plug cover when the connector halves are joined together.

8. A plug and socket connector according to claim 7, wherein one cover for the socket half of the connector has two deepened channel portions formed transversely thereacross and the other said cover has one deepened portion formed transversely thereacross; and wherein the head has side flanges formed thereon projecting oppositely from the shroud; said side flanges having the mounting feet formed integrally thereon and the said cover having one deepened channel portion also having a step formed in each side thereof and at that end thereof remote from the deepened portion whereby said cover accommodates the clamping means in the deepened channel portion and also permits variation in the height of screws securing the cover to the limb and overlies said side flanges.

9. A plug and socket connector according to claims 6 or 8, wherein the deepened channel portions on the covers function as handgrips for the connector halves.

10. A plug and socket connector according to any one of claims 1–8, wherein each said cover can be removed from a said connector half by the removal of two screws, whether the connector halves are connected or disconnected.

11. The plug and socket connector of claim 9 wherein each said cover can be removed from a said connector half by the removal of two screws, whether the connector halves are connected or disconnected.

* * * * *